Feb. 1, 1966 E. A. DAHL, JR 3,232,439

CARD FILE

Filed Aug. 29, 1963

INVENTOR.
Ernest A. Dahl, Jr.
BY
Olson, Trexler
Wolters & Bushnell attys.

3,232,439

CARD FILE

Ernest A. Dahl, Jr., 729 Greenwood Ave., Wilmette, Ill.

Filed Aug. 29, 1963, Ser. No. 305,426
4 Claims. (Cl. 211—10)

The present invention pertains to filing trays and relates particularly to an improved filing tray for accommodating file cards of various non-standard widths.

Accompanying the installation of a large information handling machine or computer is a selection of accessory equipment needed for efficient use of the computer. Frequently, a newly installed machine is a unit having a capacity larger than the one which it may have replaced and may thus require a reconsideration of the related accessory equipment. A bookkeeping machine which utilizes numerous file cards is often found in the above category and a change in machine usually entails reconsideration of its related card filing devices.

When designing a bookkeeping system for use in a card-handling computer the card size is usually dictated in part by the quantity of information to be placed thereon to perform the program at hand. When a program is of some scope a great number of identically sized cards are set up which cards may be of a different width than those cards employed in other machine programs. Furthermore, in many cases it is not feasible to tailor a machine program to use a standard size card.

In the past it has been common to select a card file structure for each particular card width used by the computer. When changing to a new computer, however, the card file selected and previously used, usually being incapable of handling different size cards, would be replaced. Economically the change in filing equipment placed a significant burden on the machine user.

In view of the above it is an important object of this invention to provide an improved card file structure which is adaptable for holding cards of various widths.

Another object of the invention is to provide an improved card file which is simply and easily modified with the use of common hand tools to hold a plurality of cards having a width different from the cards previously filed therein.

Still another object is to provide a ruggedly but lightly constructed card file tray which incorporates handle structure integral with the end walls of the tray.

A further object of the invention is to provide an improved card file tray of sheet metal construction which is simple in design and arrangement, highly practical in use, economical to manufacture, and which is flexibly adapted to retain cards of various widths.

Further features of the invention pertain to the particular arrangement of the card file tray whereby the above-outlined and additional features are attained.

The invention, both as to its organization and preferred manner of use, together with further objects and advantages, will best be understood by reference to the following specification taken in connection with the accompanying drawing wherein like reference numerals designate like parts throughout, in which.

Figures 1, 2, 3, 4:
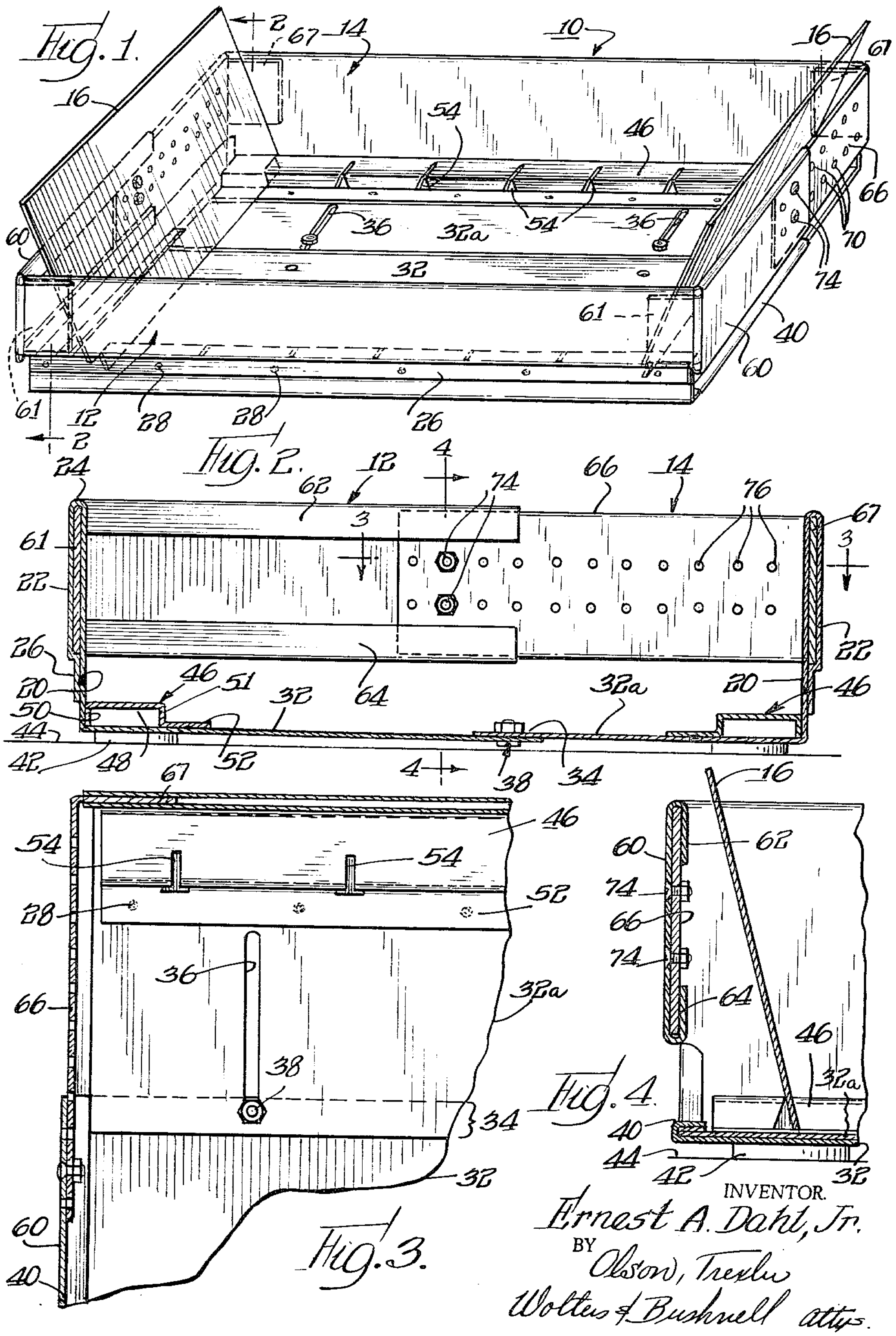
FIGURE 1 is a perspective view of a card file tray made in accordance with and embodying the principles of the present invention and showing two removable card control plates projecting above the top of the tray.
FIG. 2 is a vertical sectional view taken in the direction of the arrows along the line 2—2 in FIG. 1, the card control plates being removed from this and the following view.
FIG. 3 is a greatly enlarged, fragmentary horizontal sectional view taken in the direction of the arrows along the line 3—3 in FIG. 2.
FIG. 4 is a view in the scale of FIG. 3 taken fragmentarily in vertical section along the line 4—4 of FIG. 2.

In FIGURE 1 of the drawing there is designated generally by the numeral 10 a card file tray made in accordance with and embodying the principles of the present invention. The tray 10 comprises a first half-tray 12 and a complementary second half-tray 14, and is further provided with two spaced apart card control plates 16.

The first 12 and second 14 half-trays are preferably of sheet metal construction and are each provided with a side member defined by an inside 20 and an outside wall 22, best shown in FIG. 2. The inside wall 20 is formed integral with the outside wall 22 being interjoined thereto along a bent portion 24 at the upper horizontal edge of the side member. The lower margin of the outside wall 22 is united at an inwardly extending flange 26 to the inside wall 20, a plurality of spaced spot welds 28 (clearly shown in FIG. 1) rigidly securing together the inside 20 and outside walls 22. Between the smoothly turned upper edge 24 and the flange 26 the inner and outer walls are spaced apart so as to define a hollow therebetween extending substantially the entire length of the respective side member.

At the lower margin the inner wall 20 is bent horizontally at a right angle to define a bottom panel 32, the panel on the second half-tray 14 being designated 32*a*. It will be perceived that the panels 32, 32*a* are disposed in an overlying relationship along a portion 34 extending between the ends of the tray 10, panel 32*a* extending over panel 32. As shown in FIGS. 1 and 3, a pair of slots 36 elongated laterally of the tray 10 are arranged in panel 32*a* and an aperture is provided in the lower panel 32 for receiving a fastener 38 fixedly to secure together the panels 32, 32*a* of the first 12 and second 14 half-trays.

Referring now specifically to FIGS. 1 and 4, it will be seen that the lateral edges of the bottom panel 32 are inwardly flanged as at 40 to receive therein and hold securely the lateral edges of bottom panel 32*a* of tray member 14.

The underside of each panel 32, 32*a* is provided adjacent the corners of the respective half-tray member with pad elements 42 for cushioning the tray 10 with respect to a support surface 44, shown in FIGS. 2 and 4. Preferably the pads 42 are of wool felt material.

On the inside of the tray 10 adjacent the corner between bottom panel and side of each half-tray is disposed an elongated channel element 46 which extends substantially the full length of the adjacent side. Thus there are two laterally spaced channels 46 which cooperate to perform two functions: to act as locating means for the card supports 16; and to support the file cards (not shown) at their ends holding them above the bottom panels 32, 32*a* and clear of the fasteners 38. Each channel 46 includes a horizontally disposed web 48 having at its outer end a vertical flange 50 rigidly secured to the inside wall 20 as by spot welding. The web 48 adjacent its inner margin is provided with a second flange 51 extending vertically downwardly and terminating in a third flange 52 extending horizontally and in contact with the bottom panel 32 or 32*a* being united thereto as by spot welding.

As mentioned above the spaced channels 46 serve as a locating device or abutment means for the card support members 16 there being a plurality of slots 54 arranged in alignment with the channels 46 for this purpose. Each slot 54 includes an inverted V opening in the vertical flange 51 and an elongated narrow opening in the horizontal web 48, the width of the opening in the web 48 being essentially complementary to the thickness of the support 16, clearly shown in FIG. 4.

Coacting with the two laterally spaced apart channels 46 are the card control plates 16 mounted with their lower corners inserted into the slots 54 to provide lateral support to a stack or group of identically sized cards (not shown) which may be filed in the tray 10. It is contemplated that such cards as may be filed in the tray 10 will at their lower edges rest upon and extend between the channels 46. Projecting upwardly from the channels 46 the cards extend preferably about one-quarter of an inch above the free edges of a card control plate 16. In other words, the control plates are sized vertically to extend upwardly from the tray 10 to a line disposed about one-quarter inch below the free ends of the cards.

Although the tray 10 as illustrated herein has sidewalls 20 of modest size, cards of substantially greater height may be conveniently filed in the tray 10 by suitable sizing of the card control members 16. That is, when a group of tall cards is to be handled, control plates 16, preferably in pairs, are arranged in the tray at each end of the group of cards. Thus, through the use of control plates of preselected heights the tray 10 may be adapted readily to accommodate different groups of cards varying by height.

In regard to different groups of cards varying by width, control plates 16 sized complementary to such width are used. Thus the tray 10 having lateral adjustment provisions, described more fully below, may accommodate cards of different widths, and through use of control members 16 of various heights, the tray 10 may accommodate cards of widely different heights.

Referring to FIG. 1 particularly, the first half-tray 12 includes two end members 60 of essentially identical construction. Being generally L-shaped in form, each end member 60 includes a long leg element having overturned upper and lower flanges 62, 64 respectively, as shown in FIG. 4. The flanges 62, 64 are spaced from the vertical portion of element 60 a distance to define receiving grooves for accommodating in a telescoping relationship end structure 66 of the second half-tray 14.

The end members 60 of the first tray 12 are received between the inner and outer walls 20, 22 of the first tray 12, a short leg 61 of the L-shaped element 60 being insertable therein as shown by broken lines in FIG. 1 and rigidly secured to the wall structure 20, 22 as by spot welding. It is to be understood that the inserted portion 61 of the end 60 extends but a short distance within the hollowed portion of the tray's side.

The end structure 66 of the second half-tray 14 is complementary to the end 60. More specifically, the element 66 is formed of solid material and telescopes into the flanges 62, 64, clearly shown in FIGS. 2 and 4. The element 66 is also L-shaped in general form and has an end portion 67 inserted into the hollow side structure of the second half-tray 14 particularly between the inner and outer walls thereof, as shown in FIG. 3, and rigidly secured thereto as by spot welding.

As shown in FIGS. 1 and 2, each end 66 is provided with a plurality of pairs of apertures 70 spaced at predetermined intervals. The ends 60 of the first half-tray 12 are each provided with a pair of apertures for receiving fasteners cooperable selectively with the apertures 70 for holding the half-tray members fixedly together with the sidewalls at a selected distance apart to accommodate within the tray 10 a card of a particular width.

When it is desired to enlarge the tray 10 so as to accommodate a wider card it is only necessary to dismount the two fasteners 74 in each end of the tray 10 and loosen the two fasteners 38 in the bottom panels 32, 32*a* so as to permit relative sliding movements between the half-trays. When a new spacing of the half-trays is selected, the aforementioned fasteners are simply reinserted and tightened with simple hand tools such as a screwdriver and pliers and the tray is ready to receive a card of a greater width.

From FIGS. 1 and 4 it will be observed that the lowest extent of each tray end is disposed above the bottom panel 32. Further this region of the tray end is smooth as the flange 64 is an upwardly curved element. This arrangement affords convenient gripping means for placing the hand into the space between the bottom panels 32, 32*a* and the tray ends for carrying the tray 10.

While there has been described what is at present considered to be the preferred embodiment of the invention, it will be understood that various modifications may be made therein, and it is intended to cover in the appended claims all such modifications as fall within the true spirit and scope of the invention.

The invention is claimed as follows:

1. A card file tray comprising: complementary first and second half-trays, each half-tray including a side member having spaced inside and outside walls defining at each end of the respective side member a vertically elongated pocket, each half-tray having a bottom panel united to one of said walls, the bottom panels of said half-trays having portions disposed in slidably overlapping relationship; an L-shaped end member extending into each said pocket of said side members in rigidly secured relation therewith, the end members of said first half-tray having vertically overturned upper and lower horizontal edge portions defining retaining grooves, the end members of said second half-tray having portions telescopically received in said retaining grooves; and means fixedly securing together the contiguous portions of said end members.

2. A card file tray comprising: complementary first and second half-trays, each half-tray including a side member having closely spaced apart inside and outside walls defining at each end of the respective side member a vertically elongated pocket, each half-tray having a bottom panel integral with one of said walls, the bottom panels of said complementary half-trays having portions disposed in slidably overlying relationship, the bottom panel of said first half-tray having horizontally overturned edge portions extending over the edge portions of the bottom panel of said second tray member; an end member extending into each said pocket of said side members in rigidly secured relationship therewith, the end members of said first half-tray having vertically overturned upper and lower horizontal edge portions defining retaining grooves, the end members of said second half-tray having portions telescopically received in said retaining grooves, said end members of said second half-tray having a plurality of pairs of apertures spaced apart incrementally, the end members of said first half-tray each having a pair of apertures complementary spaced to those of said second half-tray; and fastener means disposed in a pair of said apertures to secure together the contiguous portions of said end members.

3. The card file tray defined in claim 2 wherein the upper horizontal edges of said side and end members are substantially coplanar, the lower horizontal edges of said end members being spaced vertically above said bottom panels a distance permitting insertion of the fingers for carrying said tray by said telescoping end members.

4. The card file tray defined in claim 2 wherein the bottom panel of said second half-tray is provided with a spaced pair of slots elongated in the direction of said end members, wherein the bottom panel of said first half-tray is provided with fastener receiving apertures cooperable with said slots, wherein fasteners having tool-engageable formations are disposed in the aligned apertures and slots to extend the tool-engageable formations thereof above said panels, and wherein spaced abutment means extend along the bottom panels of said tray parallel with said side members and spaced above said formations to define file card supporting surfaces.

References Cited by the Examiner

UNITED STATES PATENTS

| | | | |
|---|---|---|---|
| 1,298,628 | 3/1919 | Ross | 211—11 |
| 1,714,266 | 5/1929 | Johnson | 220—8 |
| 1,917,980 | 7/1933 | Kelsey | 129—16 |
| 2,223,074 | 11/1940 | Martin | 220—8 X |
| 2,625,162 | 1/1953 | Edeborg | 129—16 |
| 2,637,324 | 5/1953 | Segal | 129—16 |
| 2,843,131 | 7/1958 | Wolters | 129—16 |
| 2,987,195 | 6/1961 | Smith | 211—175 |

CLAUDE A. LE ROY, *Primary Examiner.*

FRANK L. ABBOTT, *Examiner.*